No. 666,804. Patented Jan. 29, 1901.
J. W. HARVEY.
FEEDER ATTACHMENT FOR THRESHING MACHINES.
(Application filed June 23, 1898.)

(No Model.) 2 Sheets—Sheet 2.

WITNESSES INVENTOR

UNITED STATES PATENT OFFICE.

JOHN W. HARVEY, OF MANSFIELD, OHIO.

FEEDER ATTACHMENT FOR THRESHING-MACHINES.

SPECIFICATION forming part of Letters Patent No. 666,804, dated January 29, 1901.

Application filed June 23, 1898. Serial No. 684,242. (No model.)

*To all whom it may concern:*

Be it known that I, JOHN W. HARVEY, of Mansfield, Ohio, have invented a new and useful Improvement in Feeder Attachments for Clover-Hullers and Grain-Threshers, of which the following is a full, clear, and exact description, reference being had to the accompanying drawings, forming part of this specification, in which—

Figure 1:
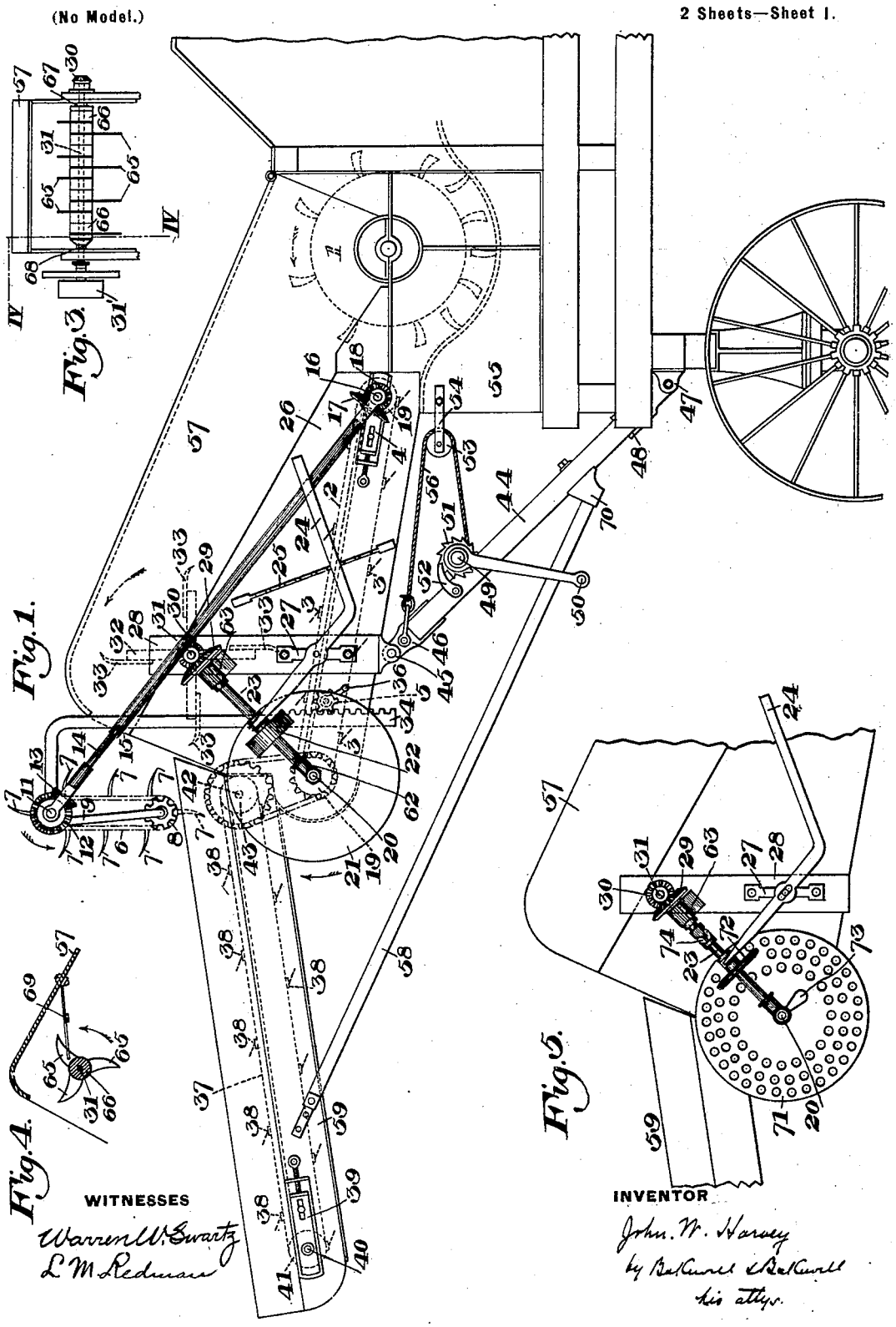
Figure 2:
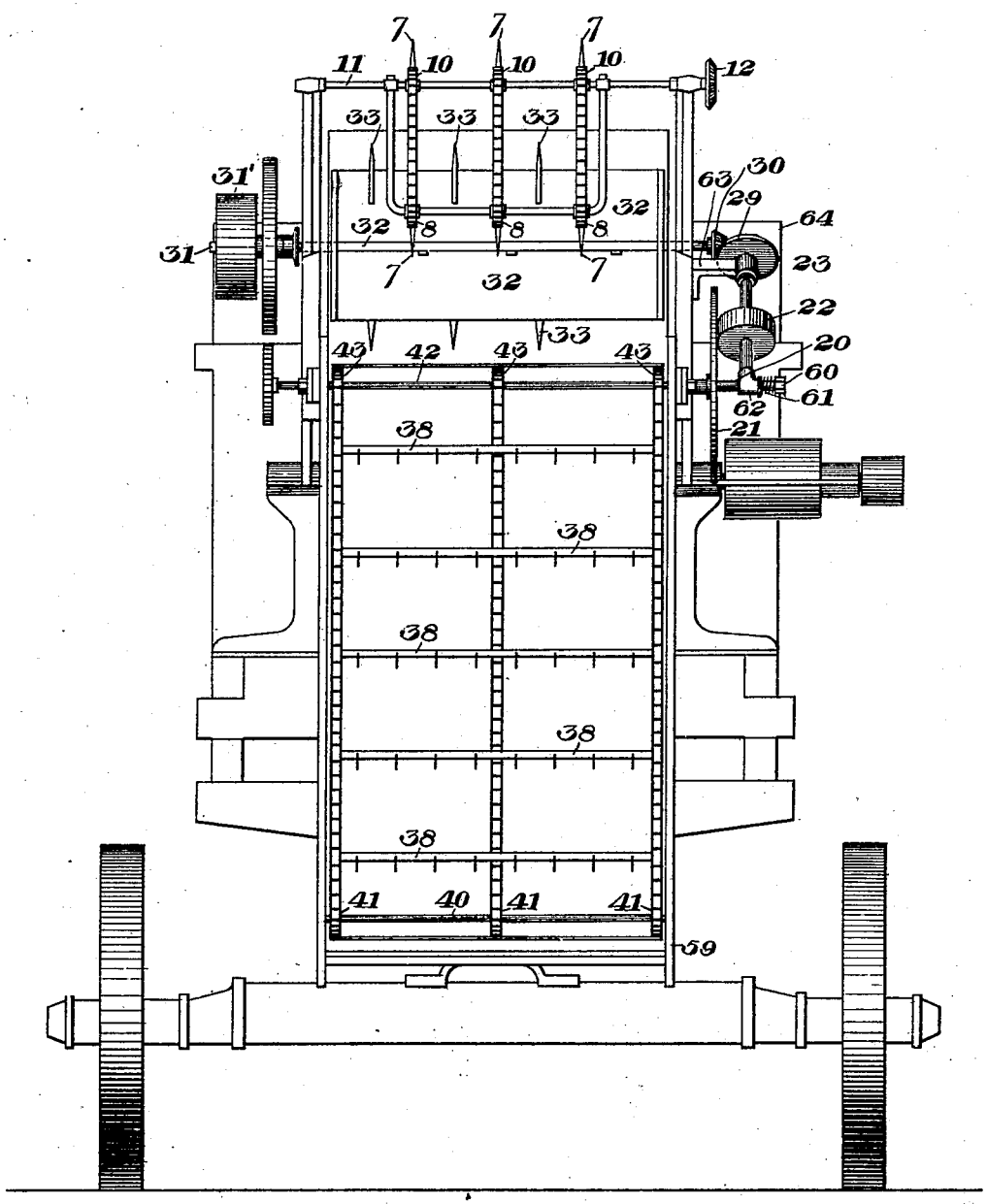

Figure 1 of the drawings shows in side elevation part of a clover-hulling machine provided with my improvement, the frame of the machine being in vertical section. Fig. 2 is a front elevation of Fig. 1, the web-frame 59 being shown in its lower position for transportation. Fig. 3 shows in elevation the band-cutters which I may substitute for the picker wings and fingers when it is desired to use the machine for feeders for feeding wheat, &c. Fig. 4 is a vertical section on the line IV IV of Fig. 3. Fig. 5 shows a modified construction of driving mechanism which I may substitute for the frictional driving mechanism 21 22 of Fig. 1.

1 is the threshing-cylinder of a separator, which cylinder is or may be of ordinary construction.

2 is a web comprising endless chains or bands traveling in the direction of the arrow for the purpose of delivering the clover or grain to the cylinder 1. Said web carries cross-slats 3 3, having pins which on the upper branch of the web slant in the direction away from the cylinder. The front web-shaft is journaled in a slide-box 4, provided with adjusting mechanism, as shown in Fig. 1.

For the purpose of regulating the feed of the straw from the first hopper and feeding-web 37, hereinafter to be described, I employ a moving retarder, consisting of sprocket-chains or web 6, having fingers 7. These chains pass around the sprocket-wheels 8 on the retarder-frame 9 and around sprocket-wheels 10, keyed to a shaft 11, the gearing of these sprocket-wheels being such as to cause them to revolve slowly relatively to the speed of the web 37. This gearing comprises a bevel-pinion 12 on the shaft 11 and a bevel-pinion 13 on a shaft 14, which is made in two parts telescopically fitted together, as at 15, so as to be capable of being elongated or shortened to permit the raising and lowering of the retarder with the adjusting-bracket 34, hereinafter described. At the other end of the shaft 14 is a bevel-pinion 17, meshing with a pinion 18 on the shaft 16 of the sprockets of the web 2, so that the motion of the web 2 will drive the shaft 14 and the retarder.

The web 2 is driven from the sprocket-wheels 19 on a shaft 20, which is driven by adjustable gearing comprising a disk 21, fixed to the shaft 20 and in contact with a driving friction-roller 22, which is mounted upon a shaft 23 with a feather-and-spline connection, so as to be adjustable longitudinally by a suitable hand-lever 24, which may be held in desired position by a notched bracket 25 on the feeder-frame 26, the lever 24 being pivoted on the bracket 27 of the frame 28 and the shaft 23 being stepped in a bearing-box 62 and journaled at the other end in a box 63. The nearer the roller 22 is moved toward the center of the disk 21 the faster will be the rate of speed transmitted to the shaft 20. The shaft 20 has a coiled spring 61 and nut 60, adapted to hold the roller 22 in frictional contact with the disk 21.

29 is a bevel-pinion on the shaft 23, meshing with a bevel-pinion 30 on the shaft 31, which, as illustrated in Fig. 1, is the picker-shaft, but which, as shown in Fig. 3, may be provided with band-cutters.

32 32 are the picker-wings, which carry fingers 33 and are driven in the direction of the arrow, a driving-pulley 31' being applied to the shaft 31.

The retarder-frame 9 may be adjusted vertically by raising or lowering its supporting-bracket 34, the adjusting mechanism consisting, preferably, of a gear-wheel 5, operating upon a toothed portion of the bracket and adapted to be rotated by a crank 36, so that the proper adjustment of the lower end of the retarder relatively to the straw or grain delivered to the machine may be readily effected.

37 is the receiving and feeding web, on which the clover or bundles of wheat are pitched and by which they are delivered to the web 2. Like the web 2, this web 37 is fitted with cross-slats and rearwardly-inclined pins 38. It has also a sliding box 39, in which is journaled the web-shaft 40, on which are the sprocket-wheels 41. The shaft 42 at the other end of the web is the driving-shaft, and it carries sprockets 43, which are driven from the shaft 20.

When the clover is pitched upon the web 37, it is carried thereby under the retarder-fingers 7 and is delivered onto the web 2, where it is subject to the action of the picker-fingers 33, the retarder serving to regulate the passage or flow of the clover and to prevent clogging. The retarder distributes evenly all large bunches, and thus makes my self-feeding apparatus a practical success when the machine is used with tough clover, straw, or flax.

Each of the frames or hoppers of the webs 2 and 37 has two floors, as shown in the drawings, and these obviate any littering or waste of material. The frames or hoppers themselves are connected with a hinge-joint, which allows the hopper of the web 37 to be folded under the other hopper, as in Fig. 2, so as to be out of the way for transportation.

44 is one of two braces secured to the feeder-frame 26 by brackets 45 and 46 and secured to the separator-frame by brackets 47 and 48.

49 is a windlass on the brace 44, having a crank 50, ratchet 51, and pawl 52. A rope 56 is secured to one end of the brace 44, thence passes around a pulley 53 on a bracket 54, and thence to the windlass 49, so that by means of said windlass the feeder-frame 26 may be dropped back from the cylinder when desired.

The frame 59 of the web 37 is upheld by braces 58, which extend therefrom to brackets 70 on the braces 44. When it is desired to fold the frame 59 down for transportation, the braces 58 are unstepped from the bracket 70.

57 is a cap which covers the web 2 and the picker-wings 32.

When I use the machine for feeders for feeding wheat, &c., I substitute for the picker-fingers a series of band-knives 65, set upon the shaft 31 and fastened thereon in a series, with interposed washers 66 and an end collar 67 and the nut 68 holding all the knives in proper position. The knives are intended to rotate and to cut the bands by which the bundles of wheat are tied, and each knife as it rotates passes through a slot in the bracket 69, which serves to prevent any wrapping of the knives or throwing out of the grain in front of the feeder. When the band-knives are employed, the retarder may be set between the band-knives and the threshing-cylinder.

In Fig. 5 I show a substitute for the friction-gearing illustrated in Fig. 1. 71 is a disk provided with circular series of perforations. A pinion 72 is slidingly mounted on the shaft 23 with a feather-and-spline connection and is adapted to be moved thereon by the lever 24, so as to engage any of the series of perforations, the pinion being first disengaged from the perforations by a lever or handle 73 on the step of the shaft 23. The shaft 23 has a knuckle-joint 74.

These forms of driving mechanism enable me to change the speed of the parts of the machine connected therewith without stopping the machine.

The advantages of my invention will be appreciated by those skilled in the art.

I claim—

1. In a thresher or huller, the combination with a threshing-cylinder, of a continuous feeding-web arranged to carry the grain forward upon its upper face, a vertically-adjustable retarder located above the web and independent of the cylinder, mechanism for clamping the retarder in any of its different vertical positions, said retarder consisting of an endless carrier with projecting pins, and actuating connections arranged to drive the retarder continuously in the same direction as the web and at a lower rate of speed than said web; substantially as described.

2. In a thresher or huller, the combination with a threshing-cylinder, of a continuous feeding-web arranged to carry the grain thereto upon its upper face, a continuously-moving retarder above the web and independent of the cylinder, said retarder comprising shafts located one above the other and each having sprocket-wheels, sprocket-chains carried on said wheels and having projecting pins arranged to travel with the material on the web, mechanism for adjusting the retarder vertically and clamping it in its adjusted position, and connections arranged to drive the retarder in the same direction as the feeding-web and at a lower rate of speed than said web; substantially as described.

3. In a thresher or huller, the combination with an outer continuous feeding-web arranged to receive the grain, of a vertically-adjustable retarder located above the inner end of the web, mechanism for clamping the retarder in any adjusted position, said retarder comprising an endless carrier having projecting pins, mechanism for driving the retarder continuously in the same direction as, and at a lower rate of speed than the feeding-web, and a second continuous feeding-web arranged to receive the grain dropping from the outer feeding-web, and carry it to the threshing-cylinder; substantially as described.

4. In a thresher or huller, the combination with an outer continuous upwardly-inclined feeding-web arranged to receive the grain, of a vertically-adjustable retarder located above the inner end of the web, mechanism for clamping the retarder in any adjusted position, said retarder comprising an endless carrier having projecting pins, mechanism for driving the retarder continuously in the same direction as, and at a lower rate of speed than the feeding-web, and a second continuous feeding-web arranged to receive the grain dropping from the outer feeding-web, and carry it to the threshing-cylinder, and a rotating picker above the second web; substantially as described.

In testimony whereof I have hereunto set my hand.

JOHN W. HARVEY.

Witnesses:
J. E. BROWN,
KATHRINE HOLWAY.